Feb. 8, 1955      H. C. LUKENS ET AL      2,701,502

PHOTOMETRIC DEVICE FOR MEASURING THE COLOR OF OBJECTS

Filed June 10, 1952      3 Sheets-Sheet 1

H. C. LUKENS
R. P. MacKENZIE
INVENTORS

BY *W. Bier*
ATTORNEY

Feb. 8, 1955  H. C. LUKENS ET AL  2,701,502
PHOTOMETRIC DEVICE FOR MEASURING THE COLOR OF OBJECTS
Filed June 10, 1952  3 Sheets-Sheet 3

H. C. LUKENS
R. P. MacKENZIE
INVENTORS

BY *W. Bier*
ATTORNEY

United States Patent Office 2,701,502
Patented Feb. 8, 1955

2,701,502

PHOTOMETRIC DEVICE FOR MEASURING THE COLOR OF OBJECTS

Harold C. Lukens, Orinda, and Robert P. MacKenzie, Oakland, Calif., assignors to the United States of America as represented by the Secretary of Agriculture Application June 10, 1952, Serial No. 292,776

3 Claims. (Cl. 88—14)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to photometric devices for measuring the color of objects. In particular the invention is concerned with photometric devices and procedures wherein determination of color is utilized as a measurement of a particular characteristic of a material as for example the degree of maturity of vegetables or fruits or the degree of browning, storage damage, heat damage and other factors important in the field of food processing. Further objects of this invention will be apparent from the description herein.

It is well understood that color is an important factor in determining the characteristics of various materials. For example, the ripeness of fruits and vegetables is commonly judged by noting the color of the produce in question. Although visual inspection is adequate for domestic purposes it is not reliable enough for industrial purposes. Thus visual inspection even when accompanied by standard color charts and similar visual aids is too greatly affected by such factors as color-blindness, eye fatigue, and other human frailties. In order to eliminate the human factor and to obtain more accurate measurements, various optical and electrical devices have been studied. For example, recording spectrophotometers are of great use to the scientist. These devices illuminate the object with light of different wavelengths and measure the proportion of light which is reflected by the object through the use of photoelectric tubes and accompanying electronic components. The resulting graph of percent reflectance versus wavelength is of great use in color studies for scientific purposes. The devices though giving absolute measurements require several minutes for producing the plot. Further, they are very expensive, complex machines and require a skilled operator for proper operation. For such purposes as measuring maturity of vegetables and similar uses they are simply too complicated for the object in mind. Simplified devices have been proposed in which the object is irradiated with light of a distinct color and a measurement made, through a photoelectric tube and electronic components, of the amount of light reflected. Devices of this type are suitable in some applications but oftentimes the spread in reflectance between an immature and a mature product is simply not sufficient to yield reliable results. Thus the shininess or dullness of a particular sample (as caused by presence of more or less water, dust, etc.) will greatly affect the amount of light energy reflected and cause unreliable readings. For example, in testing corn with a red light, a dull but mature sample will reflect a relatively low amount of light and cause a reading as if it were a less mature sample. The readings will also be affected by the shape of the object. For example, an ear of corn is a very irregular object and the way it is placed in the instrument will greatly affect the amount of light reflected. Here again, in testing corn with a red light, if the particular arrangement of kernels is such as to favor light scattering, the instrument will give a low reading indicative of lower maturity than is actually the case. It is only evident that devices of this type which are radically affected by the factors of varying degrees of shininess or dullness, placement of the object in the instrument, surface irregularities and so forth simply do not yield dependable information. In efforts to reduce the effect of the above-mentioned complicating factors, techniques have been advocated which involve irradiation of the object with two light beams of different color. Devices of this type give more reliable but are cumbersome to use. They require manual control to change from one color to another and manual control to adjust the instrument for each reading at the different color levels. These devices can be considered as static in that they are not suited for continuous rapid measurement but require manual adjustment for each reading with the result that several minutes are required for each determination.

The device in accordance with this invention has many advantages over those of the prior art. In the first place it is of a dynamic character and completely suited to continuous determination, for example, on a food processing line. No individual adjustments are necessary once the machine has been set for a particular commodity. Each determination is virtually instantaneous, the information being given visually the instant that the object is placed in the instrument. Our device is thus suited for use on a food processing line wherein the incoming material must be rapidly and continuously sorted. Another advantage of our device is that it eliminates to a considerable extent the factors of shininess, dullness, surface irregularities and other factors which negative the use of known instruments of the single-color type. In addition, our instrument is relatively simple in construction and operation and can be adjusted and utilized by an unskilled operator.

The device in accordance with this invention embodies the principle of irradiating the object with two light rays of different color, the reflected energy impinging on photoelectric tubes. The output from the photoelectric tubes is then translated by electronic means into visual information, for example, into a reading on a milliammeter or similar device. One important feature of our device is that it is dynamic, the colored beams of light being impinged on the surface of the object in continuous, rapid sequence, as by spinning a disc containing alternate red and blue filters in front of a beam of white light directed at the object in question. This of course eliminates any need for manual control to change from one color to another. Other features of our invention pertain to the method by which the signals produced in the photoelectric tubes are handled. In the preferred modification of our device the reflected light of both colors is received by a bank of photoelectric tubes whereby to produce in the output of the tubes a pulsating direct current. This current is pulsating because the photoelectric tubes are irradiated with light which not only alternates in color but also in energy content. For instance, in our arrangement if a red object is irradiated alternately with blue and red light the output of the photoelectric tubes will be at a maximum at the instant the light is red because most of the red light is reflected and at a minimum when the light is blue because most of this light is absorbed. This pulsating direct current output of the photoelectric tubes is then fed into an amplifier preferably through a condenser to eliminate the D. C. component since only the pulsing component of the output is needed. After suitable amplification, the signal is now rectified and fed into a suitable instrument such as a milliammeter. The reading on the milliammeter is a measure of the difference between the amount of light of one color which is reflected from the object and the amount of light of the other color which is reflected from the object. Thus if red and blue are the colors in question and the difference in reflectance of the object for these colors is low, then the reading on the milliammeter will be low. On the other hand, if the instrument is subjected to a series of objects of increasing red reflectance and equal or decreasing blue reflectance then the instrument will give higher and higher readings because the visual information represents the difference in reflectance of the two colors.

One of the features of our invention is that we use the reflectances of two colors and measure the difference in reflectance of the two colors. The importance of these factors is that thereby the spread—the difference in readings obtained with samples of corn of differing maturity—is increased. This means that errors due to such factors as shininess or dustiness, surface irregularities and other extraneous factors have a reduced effect on the reading. If but a single color is used, the spread between immature corn and mature corn would be small—only 4 or 5% reflectance and the effect of extraneous factors would greatly affect the reading obtained. In our technique the spread is approximately double that obtained with a single color so that the effect of extraneous factors on the reading is reduced proportionately.

In applying our invention to testing yellow varieties of corn for maturity, we prefer to employ the colors blue and red for the reflectance measurements. These colors are particularly adapted for this commodity because of the particular color changes as corn matures. Thus as this commodity matures, the percentage reflectance of blue decreases whereas the percentage reflectance of red increases. By measuring the difference between the reflectances in the red and blue for each sample of corn, we obtain a greater range of differences in the range from immature to mature corn than would be possible if the measurements were based on either color alone or with other color combinations. The significance of red and blue measurements can best be illustrated by the following figures:

| Immature yellow corn | | Mature yellow corn | |
| --- | --- | --- | --- |
| | Percent | | Percent |
| Reflectance, red | 70 | Reflectance, red | 75 |
| Reflectance, blue | 25 | Reflectance, blue | 20 |
| difference | 45 | difference | 55 |

It is evident from the above that by utilizing the difference in reflectance between red and blue, a wider working range from immature to mature is provided than if we were to employ only the red or blue alone which differs only by 5% over the maturity range. This wide working range is significant in reducing extraneous effects of shininess, surface irregularities, etc. as explained above.

It is to be emphasized that though our invention is particularly aimed at measuring the maturity of corn using the colors blue and red, the scope of our invention is not so restricted. The apparatus and technique herein described may be applied in many other fields where color plays a role. Some of the applications which may be noted are standardizing of paints, dyes, pigments, colored fabrics and paper, determining efficacy of washing, bleaching, dyeing and scouring procedures on fabrics or fibers, and so forth. In the food processing field the applications of our invention are manifold. For example, many factors such as heat, storage, oxidation, blanching conditions, freezing, etc. will affect the color of fruits and vegetables and our invention can be utilized to measure the amount of damage or standardize the processing required to prevent such damage. The particular colors to utilize for the reflectance measurements will depend on the commodity being studied. For example the browning of peaches due to processing or storage changes could be followed with the use of blue and either yellow or red light. The damage in tomato paste due to overheating could be followed with light in the blue and red regions. The maturity of oranges and lemons would require blue and yellow or blue and red light. In any event the proper colors to use could be determined by initially obtaining spectrophotometric graphs of reflectance vs. wavelength on samples of the material in question. From these charts one would then pick the colors which change the greatest as the factor in question (browning, maturity, heat-damage, etc.) becomes more intense.

Reference is now made to the attached drawing which illustrates apparatus within the scope of this invention. The different views are briefly described as follows.

Figure 3:
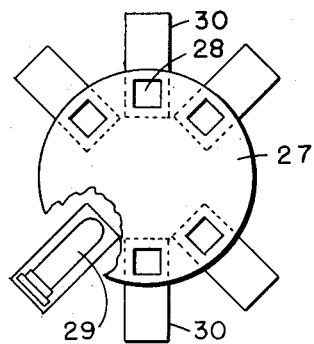

Fig. 3 is a plan view of the base 27 of chamber 25. Parts of the base and a cylinder 30 have been broken away to show photoelectric tube 29.

Figure 4:
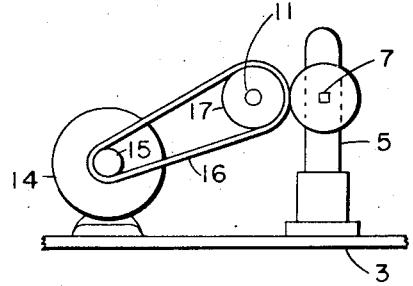
Figure 5:
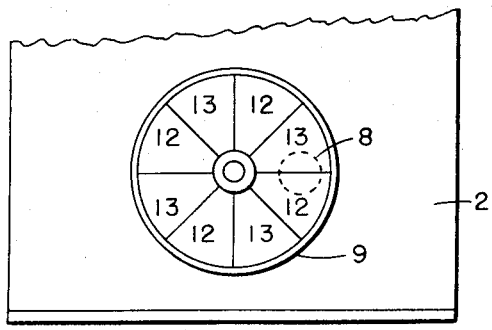

Figs. 4 and 5 are views taken in the direction of the axis of shaft 11 supporting disc 9. Fig. 4 shows the parts within partition 2; Fig. 5 shows disc 9.

Figure 6:
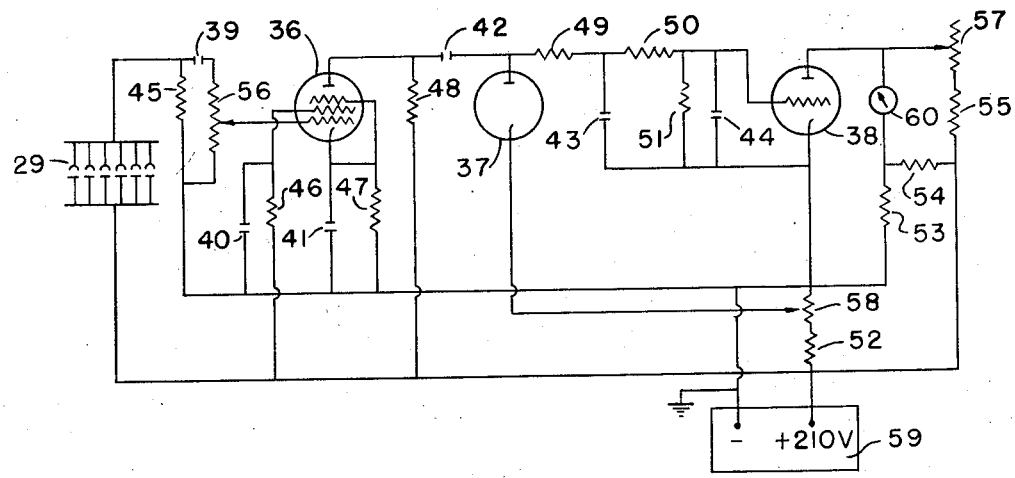

Fig. 6 is a schematic diagram of the electrical components of the system.

Figure 7:
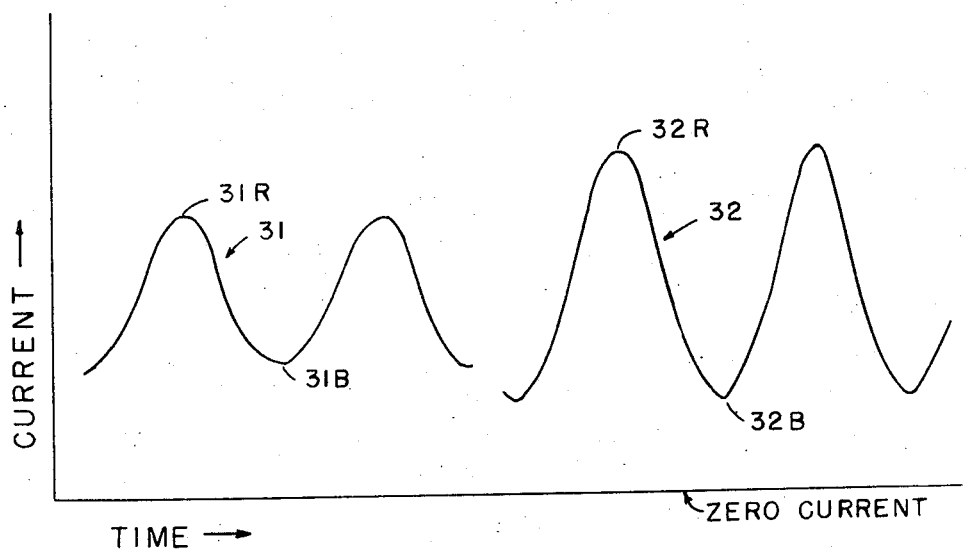

Fig. 7 is an illustration of the type of current induced.

Figure 1:
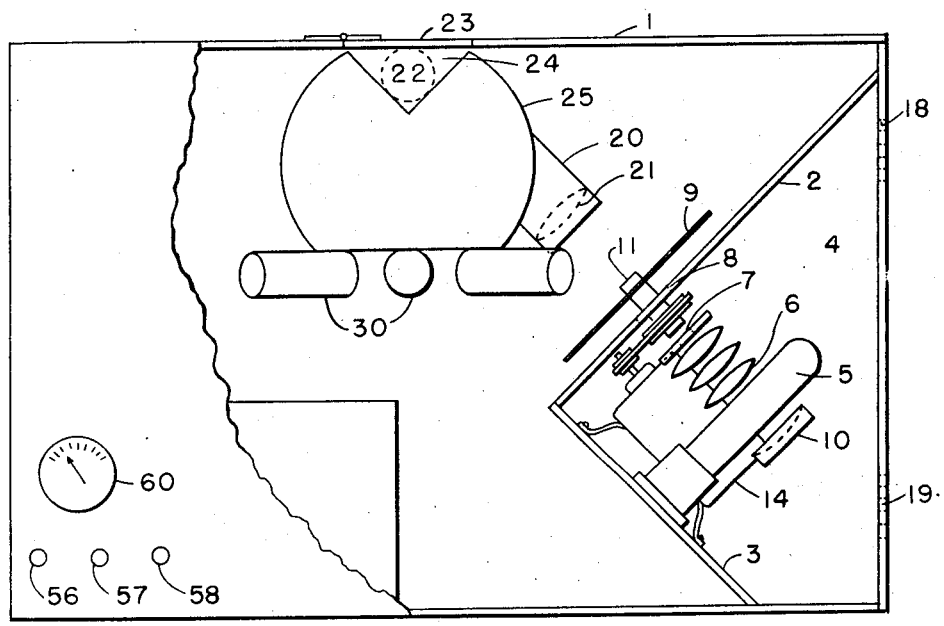
Fig. 1 is a side elevation of our preferred form of apparatus. Part of the front of the container 1 has been broken away to show the parts within.
Figure 2:
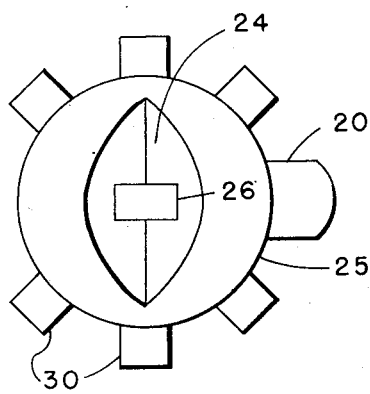
Fig. 2 is a plan view of chamber 25.

The construction of the apparatus of this invention may be explained as follows:

The apparatus is positioned in container 1 which is divided by partitions 2 and 3 to form a nearly light-tight compartment 4. In compartment 4 is positioned light bulb 5, the light rays from which pass through condenser lenses 6, stop 7, aperture 8, and disc 9. A mirror 10 is provided to assist in focusing the light on stop 7. Disc 9, mounted on shaft 11, is provided with alternate red and blue filter sections 12 and 13, respectively (see Fig. 5), and is rotated via electric motor 14, pulley 15, belt 16, and pulley 17. The speed of rotation of disc 9 and the number of filters 12, 13 are preferably correlated so that the signal output from the photoelectric tubes has a frequency from about 50 to about 2000 cycles per second. This facilitates the conversion of the signal by electronic means into a visual signal. Vents 18 and 19 are provided in the side wall of container 1 to assist in cooling lamp 5. An electric fan may also be placed in compartment 4 to assist the cooling. The light rays leaving disc 9 and now in the form of alternating red and blue color pass through tube 20 and are focused by lens 21 on the ear of corn 22. This ear of corn is placed in the apparatus by lifting hinged lid 23 and placing the ear in the recess 24 in chamber 25. Chamber 25 is a portion of a hollow sphere, the inner surface of which is painted flat white and which is provided at the top with flat plates to form recess 24. An aperture 26 (see Fig. 2) is provided in the recessed portion so that the alternating red and blue rays can impinge on the ear of corn. The flat base 27 of chamber 25 is provided with a series of ports 28 (see Fig. 3) to provide openings to photoelectric tubes 29. Each tube 29 is positioned within a cylindrical container 30 whereby no light reaches tubes 29 except through ports 28. In operation, the light reflected from ear of corn 22 passes through aperture 26 and impinges on the sensitive elements in tubes 29 giving rise to an electric current.

The current induced in tubes 29 is a pulsating direct current because the tubes are alternately irradiated with the red and blue light reflected from ear of corn 22. The type of current induced is illustrated in Fig. 7 wherein curve 31 represents the current obtained with an immature ear of corn while curve 32 relates to the current obtained from a mature ear of corn. Peaks 31R and 32R represent the current at the instant when the corn is subjected to red light whereas peaks 31B and 32B represent the current at the instant when the corn is subject to blue light. It is apparent from a comparison of the curves that the mature corn reflects more light in the red region and less light in the blue region than does the immature corn.

In order to make use of the "information" supplied by the current induced in tubes 29 various techniques may be used to translate the electrical impulses into visual or phonetic intelligence. To this end tubes 29 are connected in parallel and then connected to an apparatus such as a vacuum tube voltmeter, oscilloscope or other suitable electronic device for measuring, recording, or visualizing the information. We prefer to use the apparatus diagrammed in Fig. 6. This device has many advantages as will be apparent. The output of photoelectric tubes 29 is impressed on the grid of tube 36. Condenser 39 serves to eliminate the D. C. component and pass only the alternating current. Tube 36 and associated components act as a conventional amplifier with amplitude control 56. Tube 37, a diode clipper, acts as a rectifier and as a zero compressor. That is, it eliminates any desired fraction of the signal so that by suitable adjustment, meter 60 will record zero or nearly zero with an immature ear of corn. Without this zero compression feature, even a very immature ear of corn would produce so much signal that only a small part of the scale of meter would represent a large variation in maturity. By cutting off a part of the signal, the entire scale of the meter can be utilized for the spread between immaturity and maturity. The tube 38 and associated components function as a conventional D. C. amplifier stage. Tube 38, meter 60, potentiometer 57 and resistances 53, 54, and 55 function as a conventional bridge. In using the apparatus potentiometer 57 is adjusted so that meter 60 reads zero with the optical system shut off. This adjustment balances out the zero-signal plate current. A typically immature ear of corn is then placed in the device with the optical system turned on and then potentiometer 58 is so adjusted that meter 60 reads zero or nearly so. Potentiometer 56 is provided to allow for adjustment of the range of readings to be obtained for a given range of maturities. The device is then ready for operation and corn of increasing maturity will give proportionally higher readings on meter 60. In order to insure comparable results in day to day operation it is preferred to zero-in on a piece of wood or metal which is coated with such a color as to be equivalent in red and blue reflectance to a typically immature ear of corn. By placing this standard block in the optical system instead of an ear of corn and then adjusting potentiometer 58 to give meter 60 a zero reading, the readings on daily operation will be referable to a fixed standard. It is obvious also that similar blocks may also be used as standards for complete maturity or varying grade of maturity thus to provide unvarying standards.

The various components of the electronic system of Fig. 6 are listed below:

25, photoelectric tubes 929
36, vacuum tube, type 6S–J7
37, vacuum tube, type 6H6, only half used
38, vacuum tube, type 6J5
39, condenser, 01. microfarad
40, condenser, 0.1 microfarad
41, condenser, 10 microfarad
42, condenser, 0.1 microfarad
43, condenser, 0.1 microfarad
44, condenser, 0.1 microfarad
45, resistance, 5,000,000 ohms
46, resistance, 330,000 ohms
47, resistance, 1000 ohms
48, resistance, 100,000 ohms
49, resistance, 50,000 ohms
50, resistance, 51,000 ohms
51, resistance, 150,000 ohms
52, resistance, 70,000 ohms
53, resistance, 51,000 ohms
54, resistance, 22,000 ohms
55, resistance, 2,700 ohms
56, potentiometer, 1,000,000 ohms (volume control)
57, potentiometer, 5,000 ohms
58, potentiometer, 25,000 ohms
59, regulated D. C. power supply, 210 volts
60, milliammeter, D. C.

Having thus described our invention, we claim:

1. A photometric device comprising a hollow chamber, a recess adapted to receive an object to be tested located in the upper portion of said chamber, said recess extending downwardly into said chamber, an aperture in the base of said recess, a conduit in the side of said chamber, a light source, means for focusing a light beam from said source through said conduit and said aperture onto the object, a rotatable disc interposed in said beam, said disc bearing a series of transparent panes of two alternating colors, means for rotating said disc whereby to rapidly and continuously alternate the color of said beam between the two colors, a bank of photoelectric cells positioned beneath said chamber, apertures in the floor of said chamber whereby light reflected from the object impinges on said cells, thus to produce in the cells an electrical impulse the amplitude of which varies in synchronism with the reflectance of rays of the respective colors from the object, and means connected with said cells for translating said impulse into a visible signal, the amplitude of which signal is proportional to the difference in amplitude variation in said impulse, said last-named means including a diode clipper which acts as a rectifier and a zero compressor.

2. A photometric device comprising a hollow chamber, a recess adapted to receive an object to be tested, said recess being located in the upper portion of said chamber and said recess extending downwardly into said chamber, an aperture in the base of said recess, a conduit in the side of said chamber, a light source, means for focusing a light beam from said source through said conduit and said aperture onto the object, a rotatable disc interposed in said beam, said disc bearing a series of transparent panes of two alternating colors, means for rotating said disc whereby to rapidly and continuously alternate the color of said beam between the two colors, a bank of photoelectric cells positioned beneath said chamber, apertures in the floor of said chamber whereby light reflected from said object impinges on said cells thus to produce in the cells an electrical impulse the amplitude of which varies in synchronism with the reflectance of rays of the respective colors from the object, said cells being connected through a condenser to an amplifier, a diode clipper which acts as a rectifier and a zero compressor, and a sensitive meter whereby a visible signal is obtained which is proportional to the difference in amplitude variation in said impulse.

3. A photometric device comprising a hollow chamber, a recess adapted to receive an object to be tested, said recess being located in the upper portion of said chamber and said recess extending downwardly into said chamber, an aperture in the base of said recess, a conduit in one side of said chamber, a light source outside of said chamber, means for focusing a light beam from said source through said conduit and said aperture onto said object, a rotatable disc interposed in said beam, said disc bearing a series of transparent panes of two alternating colors, means for rotating said disc whereby to rapidly and continuously alternate the color of said beam between said two colors, a bank of photoelectric cells positioned beneath said chamber, apertures in the floor of said chamber whereby light reflected from the said object impinges on said cells thus to produce a fluctuating electrical impulse the amplitude of which varies in synchronism with the reflectance of rays of the respective colors from the object, and means for translating said impulse into a visible signal, the amplitude of which signal is proportional to the difference in amplitude variation in said impulse.

References Cited in the file of this patent

UNITED STATES PATENTS

| Number | Name | Date |
|---|---|---|
| 1,840,500 | Geffcken et al. | Jan. 12, 1932 |
| 1,943,278 | Thompson et al. | Jan. 9, 1934 |
| 2,020,281 | Stone, et al. | Nov. 5, 1935 |
| 2,022,327 | Sheldon | Nov. 26, 1935 |
| 2,162,529 | Dawson et al. | Jan. 13, 1939 |

FOREIGN PATENTS

| Number | Country | Date |
|---|---|---|
| 643,396 | Great Britain | Sept. 20, 1950 |